United States Patent [19]

Toyama et al.

[11] 4,097,556
[45] Jun. 27, 1978

[54] PPO-GRAFT COPOLYMER AND PROCESS FOR PRODUCING THE SAME

[75] Inventors: Kunio Toyama, Yokohama; Isamu Shimizu, Yamato; Takeo Imamura, Yokohama; Atsuo Nakanishi, Kanagawa, all of Japan

[73] Assignee: Asahi-Dow Limited, Tokyo, Japan

[21] Appl. No.: 766,515

[22] Filed: Feb. 7, 1977

[30] Foreign Application Priority Data

May 24, 1976   Japan .................... 51-59053

[51] Int. Cl.² ........................... C08L 51/08
[52] U.S. Cl. ............................ 260/886; 260/874; 260/876 R; 260/881; 260/884; 260/885
[58] Field of Search ............... 260/874, 875, 876 R, 260/886, 885, 881

[56] References Cited

U.S. PATENT DOCUMENTS

| | | | |
|---|---|---|---|
| 3,356,761 | 12/1967 | Fox | 260/874 |
| 3,383,435 | 5/1968 | Cizek | 260/874 |
| 3,487,127 | 12/1969 | Erchak, Jr. et al. | 260/876 R |
| 3,522,326 | 7/1970 | Bostick et al. | 260/874 X |
| 3,700,750 | 10/1972 | Yamanouchi et al. | 260/874 |
| 3,751,388 | 8/1973 | Tabana et al. | 260/874 X |
| 3,862,263 | 1/1975 | Maruta et al. | 260/874 |
| 3,929,930 | 12/1975 | Izawa et al. | 260/874 |
| 3,929,931 | 12/1975 | Izawa et al. | 260/874 |

FOREIGN PATENT DOCUMENTS

| | | | |
|---|---|---|---|
| 1,435,862 | 4/1966 | France | 260/874 |
| 2,134,399 | 8/1972 | France | 260/874 |

*Primary Examiner*—Carman J. Seccuro
*Attorney, Agent, or Firm*—Cushman, Darby & Cushman

[57] ABSTRACT

A graft copolymer having enhanced moldability with high mechanical strength capable of forming a molded article having excellent gloss, transparency and color is prepared by grafting styrene polymer segments formed under specific conditions selected onto the backbone polymer of polyphenylene ether. Said styrene polymer segments are formed by melting and kneading continuously a mixture of (a) polyphenylene ether expressed by the general formula of:

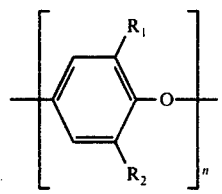

wherein $R_1$ and $R_2$ represent an alkyl group having 1–4 carbon atoms or a halogen atom, respectively, and $n$ represents the degree of polymerization and is 90–250, (b) a styrene polymer containing at least 80 weight % of styrene units and (c) styrene-containing monomers in the presence of a radical initiator at a temperature in the range from 160° to 300° C thereby to complete graft polymerization within a time ranging from 0.5 to 15 minutes, preferably under uniform mechanical shearing stress throughout said mixture during graft polymerization.

19 Claims, 1 Drawing Figure

PPO-GRAFT COPOLYMER AND PROCESS FOR PRODUCING THE SAME

The present invention relates to a graft copolymer comprising polyphenylene ether having styrene polymer segments formed by continuous polymerization within a short time while melting and kneading a composition for graft polymerization, and to a process for producing the same.

Polyphenylene ether resins are engineering plastics having excellent thermal properties, mechanical properties, and electrical properties, that cannot be obtained from conventional thermoplastic plastics, and, consequently, they have extensive fields of use.

The superb thermal properties of the polyphenylene ether resin are due to the glass-transition point being far higher than that of any conventional thermoplastic resin; furthermore, the mechanical properties are also excellent because there is no substantial change in physical properties over a wide temperature range. However, a resin comprising polyphenylene ether as the main ingredient has a serious inherent defect that the moldability is inferior to that of conventional thermoplastic resins, due to the high glass transition temperature. A wider field of industrial use is available, if the moldability can be improved without deteriorating the above excellent properties.

A great many modified polyphenylene ethers improved in moldability have been proposed, for instance, ungrafted blends produced by mixing with polystyrene (U.S. Pat. No. 3,383,435) or mixing with styrene monomer, followed by curing (U.S. Pat. No. 3,356,761); products produced by polymerization of styrene in the presence of polyphenylene ether (Japanese Patent Publication No. 22,069-1967), graft polymerization of styrene with polyphenylene ether (Japanese Patent Publication No. 41,383-1971), or employing styrene graft polyphenylene ether which is substantially free from homopolymer of polyphenylene ether (Laid-Open Japanese Pat. No. 51,150-1975 and Izawa U.S. Pat. No. 3,929,931).

Besides, it is well known that, in some cases, graft copolymers or block copolymers can be produced by melting and kneading two kinds of polymers or one or more polymers and a vinyl compound. However, there have been no processes for producing thermoplastic resins having no such groups as double bonds in the main chain of the polymer, with high graft polymerization yield, without formation of gel-like polymers and, furthermore, without degradation in mechanical strength caused by the presence of low-molecular-weight compounds. Formation of a gel-like polymer has a deleterious influence on moldability as well as on the surface gloss of a molded article. This is undesirable in practice. Furthermore, while a reaction conducted under severe conditions improves the graft polymerization yield, it produces a large amount of lower molecular weight products, degrades mechanical properties, particularly the impact strength of the product, and is prone to produce a gel-like polymer.

The inventors of the present invention introduced a process for preparing graft copolymers having substantially no polyphenylene ether homopolymer (Laid-Open Japanese Pat. No. 51,197-1975 and Izawa U.S. Pat. No. 3,929,930). The graft copolymer produced by this radical reaction has improved moldability while maintaining excellent mechanical strength as compared with conventional mechanical blends of polyphenylene ether and polystyrene resin. It has now been found that melt flow characteristics of the graft copolymer produced by a radical reaction as well as moldability of the composition containing such a graft copolymer are greatly changed by the reaction conditions of said radical reaction. Said changes are also found to be dependent not only on the structure of grafted segments of styrene polymer in the graft copolymer but also on mutual interactions between main chains of polyphenylene ether during graft polymerization. Namely, when styrene monomer or a mixture of styrene monomer with styrene polymer is heated under agitation in the presence of a relatively large amount of a radical initiator, graft polymerization occurs to produce under specific conditions a graft copolymer free from homopolymers of polyphenylene ether. During graft polymerization, however, due to inherent nature of polyphenylene ether, polyphenylene ethers are combined to larger molecules simultaneously with grafting of polystyrene segments onto the backbone of polyphenylene ethers. Presumably, radicals of polyphenylene ethers are thereby formed to form branched polymers until gel-like products are produced after polymerization is continued for a long time. The graft copolymer obtained by such an procedure is deteriorated in moldability.

An object of the present invention is to provide a graft copolymer excellent in moldability and useful for various molding materials.

Another object of the present invention is to provide a molding material improved in moldability as compared with graft copolymers of prior art and having good surface gloss and small anisotropy in injection molded products produced therefrom.

Still another object of the present invention is to provide a graft copolymer composition having improved melt flow characteristics as compared with conventional compositions containing the graft copolymer free from homopolymers of polyphenylene ether prepared by radical polymerization of prior art.

Further object of the present invention is to provide a commercially applicable process for production of said graft copolymer, which is readily operable and high in productivity.

According to the present invention, there is provided a graft copolymer having enhanced moldability, comprising polyphenylene ether having grafted thereon styrene polymer segments formed by melting and kneading continuously a mixture of polyphenylene ether, a styrene polymer containing at least 80% by weight of styrene units and styrene-containing monomers in the presence of a radical initiator at a temperature from 160° to 300° C thereby to complete graft polymerization within a time ranging from 0.5 to 15 minutes.

The graft copolymer of the present invention has enhanced moldability, better creep characteristic and better surface gloss, transparency as well as color when it is shaped into an article as compared with any one of the copolymer or composition known in the art. While being not bound by any theory, it is believed that mutual interactions between polyphenylene ethers can be disturbed by continuous graft polymerization by melting and kneading a graft composition for a short period. Under such conditions, styrene polymer segments formed in situ and/or from preformed styrene polymer can be grafted onto the backbone of polyphenylene ethers which are not combined to larger molecules, whereby the styrene polymer segments can be grafted onto each of the polyphenylene ether chain. For this purpose, therefore, it is required in one aspect that the graft polymerization time should be short enough to disturb such mutual interactions between polyphenylene ethers. In another aspect, it is also desired that the entire mass of the composition subjected to graft polymerization should be placed under conditions whereby shearing stress may be imposed uniformly throughout said composition.

The present process includes subjecting a styrene polymer to the treatment, while melting and kneading is conducted, in the presence of a large quantity of a radical initiator at high temperature, and polymerizing a styrene compound in addition thereto. These steps, however, in the past have been considered undesirable from a practical point of view, for the reason that the molecular weight of the styrene polymer would be greatly reduced and the molecular weight of such a polymer produced out of the styrene compound would be quite small. The present process provides an economical process for producing a graft copolymer which is substantially free from polyphenylene ether homopolymer, has no gel-like polymer and has excellent moldability without degradation in properties of the resin, by taking advantage of the behaviors mentioned above that have been regarded as undesirable, and by use of a unique combination with polyphenylene ether.

The polyphenylene ether specified in the present invention is expressed by the general formula of

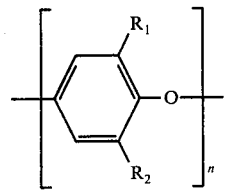

wherein $R_1$ and $R_2$ respectively represent an alkyl group of 1-4 carbon atoms or a halogen atom, e.g., chlorine or bromine, and $n$ is a number representing the degree of polymerization and ranges from 90 to 250. Examples of such polyphenylene ethers include poly-(2,6-dimethyl-phenylene-1,4-ether), poly-(2,6-diethylphenylene-1,4-ether), poly-(2-methyl-6-n-butylphenylene-1,4-ether), poly-(2-methyl-6-bromphenylene-1,4-ether), poly-(2-methyl-6-chlorophenylene-1,4-ether), poly-(2-methyl-6-ethylphenylene-1,4-ether), poly-(2,6-dichlorophenylene-1,4-ether), and poly-(2,6-di-n-propylphenylene-1,4-ether). Furthermore, it goes without saying that any polyphenylene ether copolymer constituted principally by the chemical structure of the above-mentioned general formula can likewise be usable. A few examples are a copolymer of 2,6-di-substituted phenol with 2,4-di-substituted phenol, a copolymer of 2,6-di-substituted phenol with 2,3,6-tri-substituted phenol, and a copolymer of 2,6-dimethyl phenol with 2-substituted, 3-substituted or 4-substituted phenol. The copolymers should contain over 50% of units made from the 2,6-disubstituted phenols, with the balance being from the copolymerizable material. As copolymerizing materials, there can be employed 2,4-dialkyl phenol, e.g., 2,4-dimethylphenol, 2-alkyl phenol, e.g., 2-methyl phenol, 3-alkyl phenol, e.g., 3-methyl phenol, 4-alkyl phenol, e.g., 4-methyl phenol, 2,3,6-trialkyl phenol, e.g., 2,3,6-trimethyl phenol.

The number-average degree of polymerization, $n$, of the polyphenylene ether to be employed for the present process is in the range of 90–250, preferably 100–200. When $n$ is less than 90, a polyphenylene ether homopolymer is liable to be formed; when $n$ is more than 250, a gel-like polymer is produced. These products where $n$ is outside the range stated fail to improve moldability of the product, one of the objects of the present invention, or act to degrade the surface gloss of a molded article.

The relation between the number-average molecular weight $\overline{M}n$ and $[\eta]$ has been discussed in detail when polyphenylene ether is poly-2,6-dimethyl-phenylene-1,4-ether. It is expressed by the following formula:

$$[\eta] = 1.47 \times 10^{-4} \overline{M}n^{0.85}$$

wherein $[\eta]$ is the inherent viscosity at 30° C in a chloroform solution.

In this case, the molecular weight of repeating unit of a polymer is 120, the number-average degree of polymerization $n$ can be calculated easily on the basis of $[\eta]$: In the examples hereinafter described, the value of $[\eta]$ is referred to.

It is desirable that the polyphenylene ether to be employed for the present process be in the form of a particle of 2 mm or less in weight-average particle diameter.

The styrene polymer in the present invention is polystyrene or copolymer of styrene and a copolymerizable ethylenically unsaturated compound, e.g., vinyl compound, the amount of the vinyl compound being 20 weight % or less, preferably 10 weight % or less. The copolymers include, for example, styrene-acrylonitrile copolymer, rubber-modified polystyrene, styrene-methyl methacrylate copolymer, styrene-α-methylstyrene copolymer, styrene-maleic anhydride copolymer, styrene-methyl methacrylate-acrylonitrile terpolymer, and copolymers of styrene and one or more of any other copolymerizable compounds having ethylenic unsaturation.

There can be employed either preformed styrene polymer or the styrene polymer can be formed in situ while using the free radical catalyst for grafting purposes. It is preferred to use a preformed styrene polymer as specified below.

When a preformed styrene polymer is used, the weight-average molecular weight of the preformed styrene polymer is in the range of 100,000 or over, preferably 120,000 or over, e.g., up to 200,000 or more. When styrene polymer is used where an amount of the vinyl compound or other ethylenically unsaturated compound copolymerizable with styrene is in excess of 10 weight %, the polymer radical which is produced from the styrene polymer is not able to be subjected to graft polymerization on polyphenylene ether in an effective manner under the present conditions. This results only in producing a graft copolymer of polyphenylene ether homopolymer together with a large amount of low molecular weight styrene polymer. Such a product has poor moldability and is inferior in impact strength, and is outside the present invention. The amount of the preformed styrene polymer is in the range of 40–10 weight % based on the total amount of the styrene polymer and polyphenylene ether. When the amount of the styrene polymer is less than 10 weight %, the polyphenylene ether homopolymer is left as a residue, which adversely influences moldability. When the amount of the styrene polymer is in excess of 40 weight %, the graft copolymer obtained is prone to deteriorate in mechanical strength, especially impact strength.

The monomeric styrene composition specified in the present invention is a mixture containing 90 to 100 weight % styrene and 10 weight % or less of one more ethylenically unsaturated compounds, e.g., vinyl compounds capable of being subjected to radical copolymerization. Examples of the said radical polymerizable ethylenically unsaturated compounds are acrylonitrile, methyl methacrylate, α-methylstyrene, chlorostyrene, vinyltoluene, e.g., p-vinyl toluene, maleic anhydride, and the like.

According to a preferred embodiment, the amount of the monomeric styrene-containing composition is in the range of 3–30 parts by weight, preferably 5–20 parts by weight, for every 100 parts by weight of resin consisting of 60–90 weight % of polyphenylene ether and 40–10 weight % of preformed styrene polymer. When the amount of the monomeric styrene composition is less than 3 parts by weight, the effect of the present invention cannot be achieved. On the other hand, the graft copolymer obtained by the present process is prone to be deteriorated in mechanical strength, especially impact strength, when the amount exceeds 30 parts. The percentage ratio of grafted styrene polymer based on polyphenylene ether is from 10 to 110% by weight.

A radical initiator is indispensable for the present invention, in order to promote graft reaction onto the polyphenylene ether. Examples of compounds capable of being employed as the radical initiator are di-t-butyl peroxide, t-butyl cumyl peroxide, di-cumyl peroxide, 2,5-dimethyl-2,5-di(t-butylperoxy) hexyne-3,2,5-dimethyl-2,5-di(t-butylperoxy) hexane, t-butyl hydroperoxide, cumene hydroperoxide, permenthahydroperoxide, 2,5-dimethylhexa-2,5-di-hydroperoxide, acetyl peroxide, octanoyl peroxide, 3,5,5-trimethyl hexanoyl peroxide, benzoyl peroxide, p-chlorobenzoyl peroxide, α,α'-bis(t-butylperoxy)para-di-isopropylbenzene, and the like. The above-mentioned initiators are merely illustrative and other free radical initiators can be employed.

The radical initiator can also be employed in the form of a combination of two or more kinds of radical initiators, e.g., in association with a change in polymerization temperature. In the preferred embodiment of the process of the present invention as mentioned above wherein 3–30 parts by weight of a monomeric styrene composition is added for every 100 parts by weight of a mixed resin of polyphenylene ether and styrene polymer, the amount of the radical initiator is in the range of 0.5–5 parts by weight, preferably 0.8–4 parts by weight per 100 parts by weight of mixed resin, when the amount of the initiator is less than 0.5 part by weight, the graft reaction proceeds insufficiently; while with more than 5 parts by weight, a gel-like polymer is easily produced.

The process of the present invention is conducted in the substantial absence of a solvent. When a solvent is present, there is produced a large amount of low molecular weight polymer from the styrene polymer used in the present invention, which low molecular weight polymer does not play a role in graft reaction, in association with the fact that the reaction is conducted at a higher temperature than employed in the conventional technology. Furthermore, polymers produced from the monomeric styrene composition are low in graft efficiency, accompanying low molecular weight polymers which are present in a large amount. As a result, the properties of the polymer thus obtained are impaired, especially the impact strength thereof. This is not desirable in view of the objects of the present invention. However, the solvent may be used in an amount of approximately 3 weight % based on a combination of the styrene polymer and polyphenylene ether in order to make it possible to use the initiator in the form of a solution.

It is critical in the present invention to complete graft polymerization within a short period in the range from 0.5 to 15 minutes, preferably from 0.7 to 10 minutes. The reaction time is expressed in terms of residence time (minute) which is determined by the ratio of the volume V (liter) of the composition to be graft polymerized present in a reactor to the out-put volume of the product per unit time Q (liter/minute). When the residence time is less than 0.5 minutes, homopolymers of polyphenylene ether remain in the product and unaltered styrene monomers are also left to require steps for removal of monomers whereby the process is rendered more complicated. On the other hand, when the residence time is over 15 minutes, gel-like polymers are prone to be formed to deteriorate moldability of the graft copolymer obtained. The value V is generally in the range from 0.3 to 300 liters, while the value Q falls within the range from 0.05 to 20 liter/minute, in a presently available apparatus.

The temperature for conducting the present process is in the range of 160°–300° C, preferably 200°–300° C. A temperature below 160° C causes the polyphenylene ether homopolymer to be left in the form of a residue and to have ethylenically unsaturated compound such as styrene left as a residue in the form of unaltered monomer, particularly when a high level of productivity is desired with short reaction time. On the other hand, a temperature in excess of 300° C promotes the production of gel-like polymer which impairs moldability of the graft copolymer for molding.

The composition to be graft polymerized in the present invention should preferably be placed under uniform mechanical shearing stress during polymerization. Such a uniform shearing stress is found to be attained when the composition is permitted to pass through a zone of which the length perpendicular to the surface strain for imposing shearing stress is as small as 1 to 50 mm, preferably 3 to 30 mm. While the composition is passed through such a narrow space, shearing stress is imposed at a shear rate of at least 10 sec$^{-1}$. A shear rate of less than 10 sec$^{-1}$ may sometimes cause formation of polyphenylene ether homopolymer or a gel-like polymer. The upper limit on the shear rate is not critical. Thus, it can be as much as 300 sec$^{-1}$.

Typical method for imparting uniform shearing stress is to melt and knead the composition to be grafted by extrusion, preferably through a screw type extruder. Either monoaxial or biaxial (rotating in the same or opposite directions) type screw extruder may be available. Further improved extruder, for example, co-kneader can also be used. The diameters of screw in such an extruder cannot be determined in general terms but they are dependent on the shapes of screws. For example, the diameter is selected in the range from 30 m/m to 500 m/m, preferably from 50 m/m to 200 m/m.

The ratio of length by diameter (L/D) of screw is selected in the range from 5 to 50. The revolution rate is selected in the range from 5 to 400 r.p.m., preferably from 30 to 300 r.p.m.

Any other polymers, glass fibers, carbon fibers, carbon black, fillers, such as silica, plasticizer, fire retardant or the like, may be added, so long as they do not inhibit the graft copolymerization reaction. For the purpose of improving impact resistance, it is especially desirable to add a rubber-like polymer. The only thing required for the rubber-like polymer is that the modulus of elasticity of the polymer is less than that of the graft copolymer to be obtained by the present process. Examples of such rubber-like polymers are polybutadiene, butadiene-styrene copolymer, (and other conjugated diene rubbers), polyethylene, polypropylene, ethylene copolymers, e.g., ethylene-amylene copolymer, ethylene-propylene copolymers, polyisoprene, polyisobutylene, polyacrylic acid ester, e.g., 2-ethylhexyl acrylate polymer, polyamides (for example, 6-nylon and 6,6-nylon), polyesters (for example, polyethylene terephthalate), and any modified polymers of the above. The amount of the rubber-like polymer to be added is such as is generally known in connection with the rubber-like polymer-reinforced resin compositions, and is preferably 1–30 parts by weight for every 100 parts by weight of the resin comprising polyphenylene ether and styrene polymer.

The graft copolymer obtained by the present invention contains no polyphenylene ether homopolymer, which is confirmed by analyzing the copolymer according to the method reported by A. Factor (J. Polymer Science, 7B, 205 (1969)), that is polyphenylene ether forms a complex with methylene chloride and the complex is insoluble in methylene chloride. The complex, when subjected to heating, easily evolves methylene chloride, to obtain polyphenylene ether as the residue. This is confirmed by the fact that, when the polymer obtained by the present process is dissolved in methylene chloride to form a uniform solution no precipitate is produced, or that, when some precipitate is produced after the solution is allowed to stand for many hours, the precipitate is thoroughly washed and dried, the polymer thus obtained contains inseparable polystyrene or a styrene copolymer. One skilled in the art could confirm the presence of polyphenylene homopolymer by A. Factor's process, if there were 10 parts by weight or more of residual polyphenylene ether homopolymer in a polymer obtained by the present process. Furthermore, the fact that the graft copolymer obtained by the present invention has no polyphenylene ether homopolymer can likewise be confirmed by a composition fractionating process wherein a special combination of a solvent and a non-solvent is employed for polyphenylene ether and polystyrene. In order to carry out such a process a polymer containing polyphenylene ether and polystyrene is dissolved in benzene, n-heptane is added and proper fractionation is effected in a careful manner.

The graft copolymer obtained by the present invention, when subjected to the fractionation of the composition, has inseparable polystyrene contained even in 5 weight % or less of the fractionated polymer. Shown in FIG. 1 is the result of the fractionation of the graft copolymer obtained by the present invention, together with the result using a mixed resin of polyphenylene ether and polystyrene taken as a comparison example.

The graft copolymer obtained by the process of the present invention, containing no polyphenylene ether homopolymer, can be employed by itself but it can also be blended with other polymers as well. Concrete examples of such other polymers are styrene polymers such as polystyrene, styrene-acrylonitrile copolymer or styrene-methyl methacrylate copolymer, and rubber modified styrene resins, for instance, butadiene rubber modified polystyrene, butadiene rubber modified styrene-acrylonitrile copolymer (ABS terpolymer), acrylic rubber modified polystyrene, acrylic rubber modified styrene-acrylonitrile copolymer, ethylene-propylene copolymer modified polystyrene, and ethylene-methyl methacrylate copolymer modified polystyrene. Furthermore, as indicated about the present resins can further be modified by adding thereto glass fiber, carbon fibers, carbon black, fillers such as silica, various polymers, plasticizers, and/or fire retardants.

Figure 1:
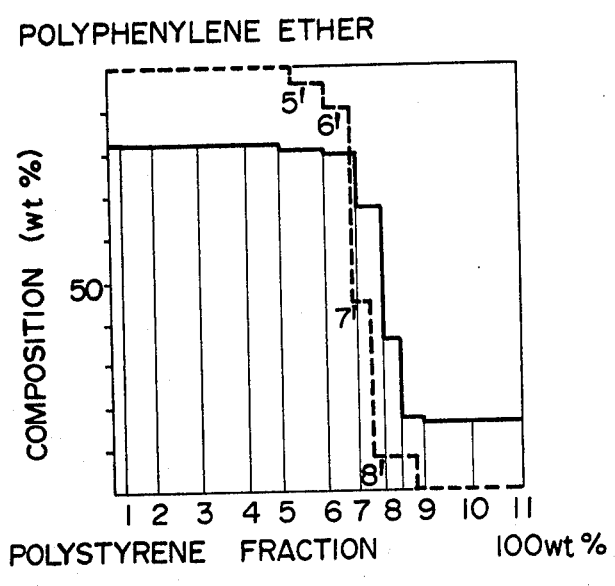
FIG. 1 of the drawings is a graph which shows fractional compositions of the reaction product obtained in Example 3 and resin composition obtained in Comparative Example 2, by fractionation with benzene/n-heptane.

The following examples explain the present process in detail, but are not intended to limit the scope of the invention thereto. All "parts" and "%" represent parts by weight and % by weight, respectively.

In the examples, physical properties are measured by the following methods:

Izod impact strength: ASTM-D-256
Melt index: ASTM-D-1238 (except for the temperature of 250° C under load of 10 kg)
Heat distortion temperature: ASTM-D-648
Surface gloss: ASTM-D-523

EXAMPLES 1 THROUGH 3

Comparative Examples 1 and 2

700 g of poly(2,6-dimethyl phenylene-1,4-ether) with average particle diameter of 0.1 mm having a [η] of 0.58 dl/g and 300 g of polystyrene (manufactured by Asahi-Dow Ltd., under the trade name of Styron 690) were subjected to dry blending by the employment of a Henshell mixer at the low rate thereof. While thus blending at this low rate, a uniform solution of 20 g of di-t-butyl peroxide in 200 g of styrene was added little by little. The mixture was subjected to agitation for 5 minutes at a high rate. A graft reaction was carried out under melting and kneading at 260° C, in a monoaxial extruder provided with a 40 mm diameter vent, applying various shear rates by changing the speed of revolution of the screw of the extruder. The depth of screw channel in metering zone was 2 mm and the total inner volume was 0.5 liter.

The thus prepared reaction product (2.0 g) was dissolved in 40 ml of methylene chloride and the solution was left for 3 hours. When precipitates were formed, the precipitates were filtered and washed with methylene chloride and then with methanol, followed by drying at 120° C under reduced pressure for 2 hours to obtain a polymer. Then, the polystyrene content in this polymer was determined by infrared absorption spectrum analysis (by the same method hereinafter). The results are shown in Table 1 in relation with shear rate.

The shear rate was calculated from the following equation at the metering zone of the extruder wherein the graft polymerization occurs:

$$S = \pi DN/h$$

wherein S is shear rate (sec$^{-1}$), D screw diameter (mm), N revolution rate of screw (r.p.s.) and h depth of screw channel (mm).

Table 1

| | Shear rate (Sec$^{-1}$) | Precipitation rate (%) | Polystyrene content (%) | Reaction time (min.) |
|---|---|---|---|---|
| Comparative Example 1 | 5 | 43 | 3 | 22 |
| Example 1 | 15 | 5 | 12 | 13 |
| Example 2 | 87 | 2 | 14 | 2.2 |
| Example 3 | 123 | 0 | — | 1.5 |

Precipitation rate is desirably 15% or less for the purpose of remarkable improvement of moldability which is the effect of the present invention. Further, polystyrene content in the precipitate, which depends also on the precipitation rate, is desired to be 5% or more. As apparently seen from Table 1, it is desirable in the present process to melt and knead the composition while giving at least 10 sec$^{-1}$ of shear rate.

FIG. 1 shows the result of subjecting the reaction product obtained in Example 3 to the fractionation of the composition by the employment of benzene-n-heptane. Comparative Example 2 is also shown in FIG. 1. Comparative Example 2 was conducted in such a manner that 700 g of the same polyphenylene ether and 300 g of the same polystyrene as used in Example 3 were blended together twice at 260° C in a monoaxial extruder provided with a 40 mm diameter vent. It is clear from FIG. 1 that the graft copolymer obtained by the present invention as referred to in Example 3 is a copolymer having the characteristic compositional distribution of polyphenylene ether and polystyrene, and is free from polyphenylene ether homopolymer. It is also clear that no graft copolymer is contained in the composition obtained by mere blending through an extruder.

Furthermore, the moldability of the reaction products obtained in Examples 1 through 3 were subjected to evaluation, and the series of results obtained are shown in Table 2.

Table 2

| | Moldability (MI) (g/10 min) |
|---|---|
| Comparative Example 1 | 7 |
| Example 1 | 22 |
| Example 2 | 21 |
| Example 3 | 24 |

It is clear from the Table 2 that the reaction product obtained by the present invention has excellent moldability.

EXAMPLE 4

700 g of poly(2,6-dimethyl phenylene-1,4-ether) having a [η] of 0.48 dl/g and 0.5 mm average particle diameter and 300 g of the same polystyrene as employed in Example 1 were subjected to dry blending by the employment of a blender. To this mixture was added a solution of 30 g of 2,5-dimethyl-2,5-di(t-butyl peroxy)-hexane in 200 g of styrene, and the product thus obtained was further subjected to mixing. The mixture was then subjected to a graft reaction under melting and kneading at the temperature of 250° C, by the employment of a biaxial extruder (rotating in opposite directions) provided with a 30 mm diameter vent, applying a shear rate of 95 sec$^{-1}$. The depth of screw channel h in metering zone of the extruder was 2.5 mm, the total inner volume 0.4 liter and the out-put volume at the rate of 0.12 liter/minute. The reaction time, that is, the residence time in the extruder, was as short as 4 minutes. Despite this, virtually no unaltered styrene was volatilized through the vent of the extruder. Thus substantially all of the amount was subjected to the polymerization reaction.

The reaction product obtained contained 59% of polyphenylene ether and the ratio of grafted polystyrene was 52% based on polyphenylene ether. The composition of the reaction product was analyzed by infra-red absorption spectrum after the product was dried at 215° C under reduced pressure in a drier for 1 hour. The ratio of grafted styrene was determined by dissolving homogeneously 2 g of the sample polymer of the product in 10 ml of chloroform, followed by careful addition of 100 ml of methyl ethyl ketone thereby to precipitate graft copolymer. the precipitate is recovered by filtration and dried at 215° C under reduced pressure in a drier for 1 hour. The resulting polymer was weighed and subjected to infra-red absorption spectrum analysis. From the results of measurements, the ratio of grafted styrene was calculated.

2.0 g of the reaction product thus obtained was dissolved in 40 ml of methylene chloride and left to stand for 6 hours. No precipitate was obtained.

1,000 g of the reaction product and 150 g of polybutadiene rubber modified polystyrene containing 40% of butadiene were blended with each other, and subjected further to polymer blending by the employment of an extruder, whereby a resin compound was obtained.

Comparative Example 3

As comparative Example 3, the polyphenylene ether, the polystyrene, and the polybutadiene rubber modified polystyrene employed in Example 4 were subjected to blending in such a manner as to obtain the same resin composition as above. The composition thus obtained was subjected twice to polymer blending by the employment of an extruder, whereby a resin composition was obtained. These resin compositions thus obtained were subjected to evaluation in terms of moldability, heat distortion temperature, the surface gloss of molded pieces, and molding anisotropy of molded articles, respectively. The anisotropy of the injection molded article was expressed in terms of Izod impact strengths of two samples cut parallel ($\parallel$) and perpendicular ($\perp$) to the direction of injection from the injection molded article shaped in flat plate of 9 cm in diameter and 3 mm in thickness. The results are shown in Table 3.

Table 3

| | | Example 4 | Comparative Example 3 |
|---|---|---|---|
| Moldability (g/10 min.) | | 18.0 | 5.1 |
| Heat distortion temperature | (° C) | 141.0 | 143.0 |
| Surface gloss | | 81.0 | 57.0 |
| Impact Strength (Kg·cm/cm) | (//) | 19 | 25 |
| | ($\perp$) | 18 | 14 |

It is clear from Example 4 that a molding material is produced according to the present process which has excellent moldability and can provide molded articles having excellent surface gloss and anisotropy while keeping mechanical and thermal properties.

Furthermore, it is clear that, when compared with the conventional technology, for instance, the process described in Japanese Patent Laid-Open No. 51,197-1975 and Izawa U.S. Pat. No. 3,929,930, the present process is a simplified one requiring no steps for removal of a solvent, and results in high productivity in association with the use of quite a large amount of a radical initiator for normal radical polymerization as well as for the present high temperature radical polymerization, in spite of the fact that styrene is added.

EXAMPLE 5

Example 4 was repeated except that poly(2,6-dimethyl phenylene-1,4-ether) with average particle diameter of 1.1 mm having intrinsic viscosity of 0.65 dl/g and polystyrene (Styron 683: trade name, produced by Asahi-Dow Limited, Japan).

The reaction product (2.0 g) was dissolved in 40 ml of methylene chloride, and left to stand for 3 hours whereby no precipitate was formed. This product had a melt index of 19 g/10 min.

EXAMPLE 6

8,000 Grams of poly(2,6-dimethylphenylene-1,4-ether) with average particle diameter of 2.0 mm having intrinsic viscosity of 0.45 dl/g and 2,000 g of polystyrene (Styron 666, trade name, produced by Asahi-Dow Limited, Japan) were dry blended in a Henshell mixer. Separately, a solution having 150 g of di-tert.-butyl peroxide dissolved in 2,000 g of styrene was prepared and 1/5 of this solution was added into the Henshell mixer and stirred for 7 minutes. This operation was repeated 5 times, followed by further stirring for 20 minutes. The resulting mixture was fed to 50 mm$\phi$ biaxial extruder ($h = 8$ mm, $V = 2.0$ l, $Q = 1.1$ liter/min; rotating in the same direction) equipped with a vent and melted and kneaded at 260° C while giving a shear rate of 105 sec$^{-1}$ thereby to conduct graft polymerization. The residence time was 2.0 minutes.

Two grams of the resulting reaction product were dissolved in 40 ml of methylene chloride and the solution was left to stand for 3 hours, whereby 3% of precipitates were formed. The precipitates formed contained 11% of polystyrene. The reaction product had 67% of polyphenylene ether and 33% of grafted polystyrene.

A mixture comprising 1,000 g of the reaction product, 150 g of rubber-reinforced polystyrene (Styron 475, trade name, produced by Asahi-Dow Limited, Japan) and 150 g of the polybutadiene-modified polystyrene as used in Example 4 was blended through an extruder to obtain a resinous composition. The resinous composition was tested for moldability and impact strength. As the result, it had a melt index of 20 g/10 min. and Izod impact strength in the parallel direction of 18 Kg.cm/cm and in the perpendicular direction of 17 Kg.cm/cm.

Comparative Example 4

Into an autoclave of 10 liter capacity was charged a mixture of 3.0 kg of the same poly(2,6-dimethylphenylene-1,4-ether) as used in Example 6, 0.75 kg of styrene and 120 g of di-tert.-butyl peroxide and the mixture was dissolved homogenerously at 120° C. While the inner temperature of the autoclave is maintained at 140°–145° C, graft polymerization was conducted for 2 hours. The product was dried at 215° C under reduced pressure in a drier for 2 hours to remove unaltered styrene to obtain a graft copolymer. This copolymer contained 86% of polyphenylene ether, and had a melt index of 4 g/10 min. A solution of 2.0 g of this copolymer in 40 ml of methylene chloride was left to stand for 3 hours, whereby there was formed no precipitate.

This copolymer was blended similarly as in Example 6 with the same polystyrene and polybutadiene-modified polystyrene as used in Example 6 to obtain a resinous composition.

This composition had melt index of 5.5 g/10 min., Izod impact strength in the parallel indirection of 6.5 Kg.cm/cm and in the perpendicular direction of 4.0 Kg.cm/cm, being by far lower in moldability and mechanical strength than the composition of this invention.

Comparative Example 5

Example 4 was repeated except that cumene hydroperoxide and polyphenylene ether having intrinsic viscosity of 0.34 dl/g were used. A solution of 2.0 g of the reaction product in 40 ml of methylene chloride was left to stand for 3 hours, whereby 26% of precipitate was formed. Said precipitate contained 1% of polystyrene.

EXAMPLES 7 AND 8

Comparative Example 6

A graft reaction was conducted in the same manner as Example 4, except that the amount of the radical initiator was modified. The amounts of the radical initiator and the results thus obtained are as shown in Table 4.

Table 4

|  | Radical initiator (g) | Precipitation rate (%) | Polystyrene content (%) | Styrene conversion (%) | Ratios of grafted polystyrene (%) |
|---|---|---|---|---|---|
| Example 7 | 7 | 9 | 13 | 95 | 57 |
| Example 8 | 40 | 0 | — | 97 | 77 |
| Comparative Example 6 | 3 | 36 | 2 | 80 | 9 |

*Styrene conversion was determined by infra-red absorption spectrum of the polymer obtained after drying the reaction product at 215° C under reduced pressure in a drier for one hour.

It is clear that the amount of radical initiator is critical for accelerating graft reaction and complete substantially polymerization thereby to eliminate the step for removal of unaltered monomers, even if the other conditions are satisfied, for the present process to be successful.

Moldability of the reaction product obtained in Comparative Example 6 was 2.4 g/10 min. as shown by melt index, which was considerably inferior to moldability of copolymer obtained by the present invention.

EXAMPLES 9 AND 10

A graft reaction was effected in the same manner as Example 4, except that the kinds of the radical initiator were varied. The radical initiator employed and the results are shown in Table 5.

Table 5

|  | Radical initiator | Precipitation rate (%) | Polystyrene content (%) |
|---|---|---|---|
| Example 9 | Cumene-hydroperoxide | 8 | 7 |
| Example 10 | Di-t-butyl-di-peroxyphthalate | 3 | 13 |

EXAMPLES 11 AND 12

Comparative Example 7

A graft reaction was carried out in the same manner as Example 4, except that the amount of styrene was varied. The results thus obtained are shown in Table 6.

The amounts of styrene (parts by weight) are shown for every 100 parts by weight of the total amount of poly (2,6-dimethyl phenylene-1,4-ether) and polystyrene.

Table 6

|  | Amount of styrene (Part by weight) | Precipitation rate (%) | Polystyrene content (%) | Ratio of grafted polystyrene (%) |
|---|---|---|---|---|
| Example 11 | 5 | 9 | 12 | 31 |
| Example 12 | 10 | 6 | 14 | 37 |
| Example 4 | 20 | 0 | — | 52 |
| Comparative Example 7 | 35 | 0 | — | — |

Impact strength of the resin composition obtained by subjecting the reaction product obtained in Comparative Example 7 to polymer blending in the same manner as Example 4 was evaluated and found to be 7.2 Kg.cm/cm (∥) and 6.5 Kg.cm/cm (⊥) which values are quite low.

EXAMPLES 13 THROUGH 15

A graft reaction was conducted in the same manner as Example 2, except that the amounts of poly (2,6-dimethyl phenylene-1,4-ether) and polystyrene and also the temperature were modified. The percentage composition and the results are shown in Table 7.

Table 7

|  | Poly(2,6-dimethyl phenylene-1,4-ether) (%) | Polystyrene (%) | Temperature (°C) | Precipitation rate (%) | Polystyrene content (%) |
|---|---|---|---|---|---|
| Example 13 | 85 | 15 | 290 | 8 | 8 |
| Example 2 | 70 | 30 | 260 | 2 | 14 |
| Example 14 | 65 | 35 | 260 | 0 | — |
| Example 15 | 65 | 35 | 220 | 4 | 15 |

Comparative Example 8

Example 9 was repeated except that 280 g of styrene was used, the temperature of the extruder was changed to 150° C and the residence time was changed to 11 minutes by changing the amount of feed. As the result, 20 g of unaltered styrene was evaporated at the vent portion and 92 g of unaltered styrene remained in the reaction product. The reaction product containing unaltered styrene was dried at 215° C under reduced pressure in a drier for 1 hour to obtain 1,163 g of a polymer.

A solution of 2.0 g of the polymer in 40 ml of methylene chloride was left to stand for 3 hours, whereby 40% of precipitate was formed. The precipitate contained 2% of polystyrene.

EXAMPLES 16 THROUGH 18

Example 1 was repeated except the revolution rate and the amount of feeding were varied to change the shear rate and the residence time to obtain the results as shown in Table 8.

Table 8

|  | Shear rate (sec$^{-1}$) | Residence time (min.) | Precipitation rate (%) | Polystyrene content (%) | Styrene conversion (%) | Ratio of grafted polystyrene (%) |
|---|---|---|---|---|---|---|
| Example 16 | 175 | 1.1 | 0 | — | 95 | 53 |
| Example 17 | 230 | 0.9 | 3 | 12 | 95 | 52 |
| Example 18 | 300 | 0.7 | 5 | 10 | 90 | 45 |

Comparative Example 9

Example 4 was repeated changing the residence time to 0.3 minutes by controlling the revolution rate of screw in the extruder. During graft polymerization, unaltered styrene was evaporated, showing clearly that the polymerization of styrene was incomplete. A part of the reaction product was dried at 215° C under reduced pressure in a drier for 1 hour. A sample of this product was measured for its composition by infra-red absorption spectrum and the content of unaltered styrene was calculated from the result to be 32%. A solution of 2.0 g of this product in 40 ml of methylene chloride was left to stand for 3 hours, whereby 46% precipitate was formed. The precipitate contained less than 2% of polystyrene.

EXAMPLE 19

Using an industrial scale biaxial extruder provided with a vent (rotating in opposite directions) having 120 mm diameter, graft reaction was practiced according to the same procedure as in Example 4 except that the mixture was melted and kneaded at 270° C under shear rate of 135 sec$^{-1}$. The depth of screw channel in metering zone of the extruder was $h = 15$ mm, the total volume $V = 26$ liter and the rate of output volume $Q = 12$ liter/min, thus giving residence time of 2.5 minutes. Substantially no unaltered styrene was evaporated from the vent portion of the extruder and conversion of styrene was measured to be 98%. A solution of 2.0 g of the reaction product in 40 ml of methylene chloride was left to stand for 6 hours, whereby no precipitate was formed.

By use of the reaction product obtained, the same composition as in Example 4 was prepared in the same manner. The composition obtained had a melt index of 20.5 g/10 min, a heat distortion temperature of 140° C, surface gloss of 83.0, Izod impact strength in the parallel direction of 20 kg.cm/cm and in the perpendicular direction of 19 Kg.cm/cm. This shows that excellent composition not known in the art can be produced from the graft copolymer produced by means of a commercial apparatus.

EXAMPLE 20

Example 4 was repeated using a polyphenylene ether having a [η] of 0.51 dl/g and 1.2 mm average particle diameter obtained by subjecting 80 parts of 2,6-xylenol and 20 parts of 2,4-xylenol to polymerization in the presence of bis(acetylacetone) ethylene-di-imine copper, nickel chloride hexahydrate and pyridine, as a catalyst.

When 2.0 g of the reaction product thus obtained was dissolved in 40 ml of methylene chloride and left to stand for 3 hours, no precipitate was produced. However, after a lapse of 6 hours, 7.5% was found to have been precipitated.

This precipitate had 11% of polystyrene.

EXAMPLE 21

Example 4 was repeated using a polyphenylene ether having a [η] of 0.50 dl/g and 0.8 mm average particle diameter, obtained by subjecting 72 parts of 2,6-dimethylphenol and 28 parts of 2,3,6-trimethylphenol to copolymerization reaction in the presence of cuprous iodide and n-butyl-amine as a catalyst.

2.0 g of the reaction product thus obtained was dissolved in 40 ml of methylene chloride and left to stand for 3 hours to produce 3% of a precipitate which had 12% of polystyrene.

EXAMPLE 22

700 g of poly(2,6-dimethyl phenylene-1,4-ether) having a [η] of 0.52 dl/g and 0.3 mm average particle diameter, 300 g of styrene-methyl methacrylate copolymer containing 6% of methyl methacrylate, 40 g of di-tert.-butyl peroxide and 150 g of styrene were mixed. Graft reaction was conducted under melting and kneading at 270° C under a shear rate of 111 sec$^{-1}$, by the employment of an extruder provided with a two-shaft vent of 30 mm diameter.

2.0 g of the reaction product thus obtained was dissolved in 40 ml of methylene chloride and left to stand for 3 hours. No precipitate was produced.

EXAMPLE 23

Graft reaction was conducted similarly as in Example 4, except 190 g of styrene and 10 g of acrylonitrile were used in place of styrene alone.

2.0 g of the reaction product thus obtained was dissolved in 40 ml of methylene chloride. After a lapse of 3 hours, a precipitate was formed (4%) which had 13% styrene polymer.

A resin composition was produced according to Example 4 by use of the reaction product thus obtained, and impact strength was evaluated.

Impact strength in the parallel direction was 16 kg.cm/cm, and that in the perpendicular direction was 14 kg.cm/cm.

Comparative Example 10

Graft reaction was conducted according to Example 4 using 150 g of styrene and 50 g of acrylonitrile, in place of styrene alone.

2.0 g of the reaction product thus obtained was dissolved in 40 ml of methylene chloride. After a lapse of 3 hours, 17% thereof was precipitated. The polymer thus obtained had 4% of styrene polymer.

Impact strength of the resin composition was obtained in the same manner as in Example 4, by the employment of the said reaction product, to find 3.6 kg.cm/cm (∥) and 0.9 kg.cm/cm (⊥). The composition was not satisfactory for practical use.

Comparative Example 11

Into an autoclave of 3 liter capacity were charged 200 g of ethyl benzene, 200 g of styrene, 700 g of the same poly(2,6-dimethylphenylene-1,4-ether) and 300 g of polystyrene and the mixture was heated to 120° C to be homogeneously dissolved. The resulting solution was heated gradually up to 220° C over 30 minutes and a solution of 20 g of di-tert.-butyl peroxide in 100 g of ethyl benzene was injected by pressure of nitrogen gas, followed by continued agitation at 220° C for 1 hour. Then the mixture was cooled and the product was recovered, followed by removal of volatiles by drying at 215° C under reduced pressure for 1 hour. A solution of 2.0 g of this reaction product in 40 ml of methylene chloride was left to stand for 3 hours, whereby 17% precipitate was formed. The precipitate contained 3% of polystyrene.

The resinous composition prepared from 800 g of this reaction product and the same polybutadiene-modified polystyrene in the same manner as in Example 4 had Izod impact strength in the parallel direction of 4 kg.cm/cm and in the perpendicular direction of 3 kg.cm/cm, showing that said resinous composition cannot practically be used.

What we claim is:

1. A graft copolymer comprising polyphenylene ether having styrene polymer segments grafted thereon improved in moldability, said styrene polymer segments being formed by melting and kneading continuously a mixture of (a) polyphenylene ether expressed by the general formula of:

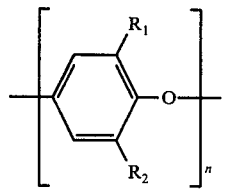

wherein $R_1$ and $R_2$ represent an alkyl group having 1–4 carbon atoms or a halogen atom, respectively, and $n$ represents the degree of polymerization and is 90–250, (b) a styrene polymer containing at least 80 weight % of styrene units and (c) styrene-containing monomers in the presence of a radical initiator at a temperature in the range from 160° to 300° C thereby to complete graft polymerization within a time ranging from 0.5 to 15 minutes.

2. The graft copolymer according to claim 1 wherein the polyphenylene ether is poly(2,6-dimethyl-1,4-phenylene ether).

3. The graft copolymer of claim 2 wherein the polyphenylene ether employed is a homopolymer.

4. The graft copolymer according to claim 2 wherein the polyphenylene ether employed is in the form of particles of not over 2 mm or less in weight-average particle diameter.

5. The graft copolymer according to claim 3 wherein the styrene polymer is preformed polystyrene.

6. The graft copolymer according to claim 2 wherein the styrene polymer is polystyrene.

7. The graft copolymer according to claim 2 wherein the styrene polymer is styrene-acrylonitrile copolymer, styrene-methyl methacrylate copolymer, styrene-α-methylstyrene copolymer, styrene-chlorostyrene copolymer, styrene-maleic anhydride copolymer, or styrene-acrylonitrile-methyl methacrylate copolymer.

8. The graft copolymer according to claim 2 wherein the monomers (c) consist of styrene.

9. The graft copolymer according to claim 2 wherein the monomers (c) consist of a mixture of styrene and less than 10 weight % of one or two compounds selected from the group consisting of acrylonitrile, methyl methacrylate, α-methylstyrene, and chlorostyrene and maleic anhydride.

10. The graft copolymer according to claim 2 wherein when (a) is a copolymer, the copolymerizable units are units from an alkyl phenol, a dialkyl phenol or a trialkyl phenol.

11. The graft copolymer according to claim 1 wherein the styrene polymer is formed in situ.

12. A thermoplastic resinous composition comprising the graft copolymer according to claim 1.

13. The graft copolymer as in claim 1 wherein the polystyrene segments are formed while placing the mixture under uniform shearing stress throughout said mixture.

14. The graft copolymer as in claim 13 wherein the mixture is permitted to pass through a zone of which the length perpendicular to the surface strain for imposing shearing stress is as small as 1 to 50 mm under a shear rate of 10 sec$^{-1}$ or over.

15. The graft copolymer as in claim 14 wherein the mixture is melted and kneaded by extrusion.

16. The graft copolymer as in claim 1 wherein 0.5 part to 5 parts of a radical initiator per 100 parts of the total of the polyphenylene ether and the styrene polymer is used.

17. The graft copolymer according to claim 1 wherein the graft copolymer is formed from a mixture of 3–30 parts by weight of styrene-containing monomers per 100 parts by weight of resin, said resin consisting of 60–90 weight % of the polyphenylene ether and 40–10 weight % of the preformed styrene polymer.

18. The graft copolymer of claim 17 wherein the styrene-containing monomers are 5–20 parts by weight per 100 parts by weight of said resin.

19. The process of claim 18 wherein the graft copolymer is formed in the substantial absence of solvent.

* * * * *

UNITED STATES PATENT AND TRADEMARK OFFICE
CERTIFICATE OF CORRECTION

PATENT NO. : 4,097,556

DATED : June 27, 1978

INVENTOR(S) : TOYAMA, Kunio; SHIMIZU, Isamu; IMAMURA, Takeo and NAKANISHI, Atsuo It is certified that error appears in the above-identified patent and that said Letters Patent are hereby corrected as shown below:

Page of drawing should be replaced by the following:

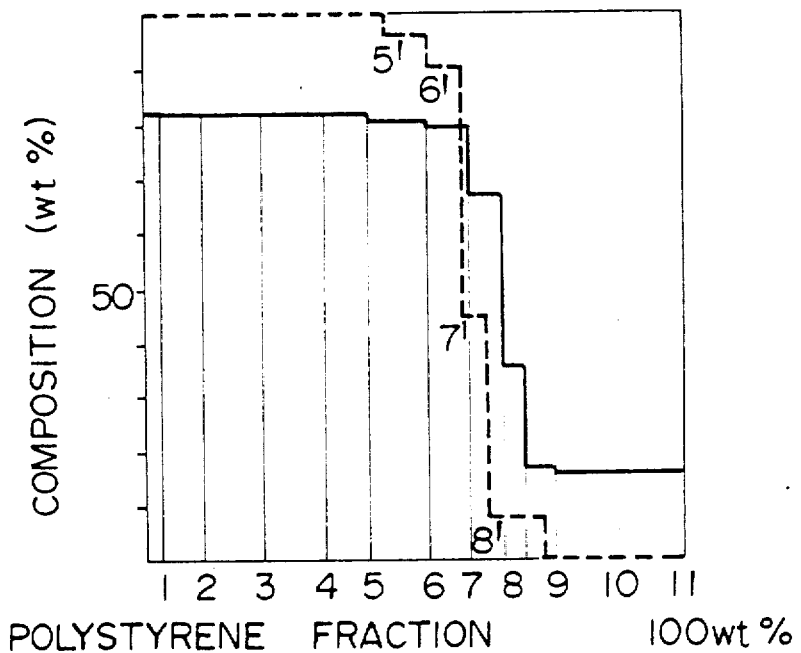

FIGURE 1

UNITED STATES PATENT AND TRADEMARK OFFICE
CERTIFICATE OF CORRECTION

PATENT NO. : 4,097,556  
DATED : June 27, 1978  
INVENTOR(S) : TOYAMA, Kunio; SHIMIZU, Isamu; IMAMURA, Takeo and NAKANISHI, Atsuo It is certified that error appears in the above-identified patent and that said Letters Patent are hereby corrected as shown below:

Column 10, Table 3 should be corrected as shown in red below:

Table 3

|  |  | Example 4 | Comparative Example 3 |
|---|---|---|---|
| Moldability (g/10 min.) | | 18.0 | 5.1 |
| Heat distortion temperature (°C) | | 141.0 | 143.0 |
| Surface gloss | | 81.0 | 57.0 |
| Impact strength (Kg·cm/cm) | (//) | 19 | 25 |
|  | ($\perp$) | 18 | 14 |

Column 15, line 24 - "Sec" should read "$sec^{-1}$".

Column 17, last line "sec" should read "$sec^{-1}$".

Signed and Sealed this

Tenth Day of April 1979

[SEAL]

Attest:

RUTH C. MASON  
*Attesting Officer*

DONALD W. BANNER  
*Commissioner of Patents and Trademarks*

UNITED STATES PATENT AND TRADEMARK OFFICE
CERTIFICATE OF CORRECTION

PATENT NO. : 4,097,556
DATED : June 27, 1978
INVENTOR(S) : TOYAMA, ET AL

It is certified that error appears in the above—identified patent and that said Letters Patent are hereby corrected as shown below:

On col. 4, line 16 "inherent" should be "intrinsic".

Signed and Sealed this

First Day of January 1980

[SEAL]

Attest:

SIDNEY A. DIAMOND

Attesting Officer　　Commissioner of Patents and Trademarks